US009268052B2

(12) United States Patent
Hoversten et al.

(10) Patent No.: US 9,268,052 B2
(45) Date of Patent: Feb. 23, 2016

(54) METHOD AND SYSTEM OF USING A DATA WEIGHTED ELECTROMAGNETIC SOURCE FOR TIME-LAPSE MONITORING OF A RESERVOIR PRODUCTION OR HYDRAULIC FRACTURING

(71) Applicants: Gary Michael Hoversten, Lafayette, CA (US); Vanessa Claire Brown, West Yorkshire (GB); David Lee Alumbaugh, Berkeley, CA (US)

(72) Inventors: Gary Michael Hoversten, Lafayette, CA (US); Vanessa Claire Brown, West Yorkshire (GB); David Lee Alumbaugh, Berkeley, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 565 days.

(21) Appl. No.: 13/693,082

(22) Filed: Dec. 4, 2012

(65) Prior Publication Data
US 2014/0156191 A1   Jun. 5, 2014

(51) Int. Cl.
*G01V 3/12* (2006.01)
*G01V 3/38* (2006.01)
*G01V 3/08* (2006.01)

(52) U.S. Cl.
CPC *G01V 3/12* (2013.01); *G01V 3/083* (2013.01); *G01V 3/38* (2013.01); *G01V 2003/084* (2013.01); *G01V 2003/086* (2013.01)

(58) Field of Classification Search
USPC .......................................................... 702/6
See application file for complete search history.

(56) References Cited

U.S. PATENT DOCUMENTS

| 7,460,436 | B2 | 12/2008 | Segall et al. |
| 7,926,562 | B2 * | 4/2011 | Poitzsch et al. .......... 166/250.01 |
| 7,987,074 | B2 | 7/2011 | Carazzone et al. |
| 8,027,790 | B2 | 9/2011 | Burtz et al. |
| 8,078,404 | B2 | 12/2011 | Sjolie et al. |
| 2008/0183391 | A1 | 7/2008 | Stoyer et al. |

(Continued)

FOREIGN PATENT DOCUMENTS

| GB | 2462861 A | 2/2010 |
| WO | 2006089269 A2 | 8/2006 |
| WO | 2010077568 A1 | 7/2010 |

OTHER PUBLICATIONS

Schlumberger Holdings Limited (a company incorporated in the British Virgin Islands) and—Electromagnetic Geoservices AS (a company incorporated in Norway), Hearing dates: Apr. 26-30, 2010, Royal Courts of Justice ,Strand, London, WC2A 2LL Date: Jul. 28, 2010, pp. 64.*

(Continued)

*Primary Examiner* — Tung S Lau
(74) *Attorney, Agent, or Firm* — Marie L. Clapp (57) ABSTRACT

A system and a method for time lapse monitoring of a target feature within a rock formation are provided. The system includes a data weighted electromagnetic source configured to generate an electromagnetic field in vicinity or at a surface of the rock formation; and an electromagnetic receiver configured to measure a component of the electromagnetic field generated by the source. The data weighted electromagnetic source includes a plurality of electromagnetic sources and an electromagnetic field contribution from each electromagnetic source is weighted so as to enhance the component of the electromagnetic field measured by the electromagnetic receiver.

32 Claims, 4 Drawing Sheets

(56) References Cited

U.S. PATENT DOCUMENTS

| | | | |
|---|---|---|---|
| 2009/0005994 A1 | 1/2009 | Srnka et al. | |
| 2009/0043554 A1 | 2/2009 | Horne et al. | |
| 2009/0254320 A1 | 10/2009 | Lovatini et al. | |
| 2009/0283258 A1* | 11/2009 | Poitzsch et al. | 166/250.1 |
| 2010/0039114 A1 | 2/2010 | Hornbostel et al. | |
| 2010/0147512 A1 | 6/2010 | Cramer et al. | |
| 2010/0161228 A1* | 6/2010 | Heliot et al. | 702/10 |
| 2011/0155389 A1 | 6/2011 | Burtz et al. | |
| 2011/0166840 A1 | 7/2011 | Green et al. | |
| 2012/0065889 A1* | 3/2012 | Wu et al. | 702/11 |

OTHER PUBLICATIONS

Timothy J. McGraw, Assessment of Ground-Penetrating Radar and Comparison With Resisitvity for Detecting Subsurface Cavities Within KARST Topography in North-Central Ohio, Aug. 2010, 72 pages.*

H. Hausmann and M. Behm, Imaging the structure of cave ice by ground-penetrating radar, Published: Apr. 13, 2011, 12 pages.*

Fan, Synthetic aperture controlled source electromagnetic, Geophysical Research Letters, vol. 37, 2010.

* cited by examiner

METHOD AND SYSTEM OF USING A DATA WEIGHTED ELECTROMAGNETIC SOURCE FOR TIME-LAPSE MONITORING OF A RESERVOIR PRODUCTION OR HYDRAULIC FRACTURING

FIELD

The present invention pertains to a system and method of using a synthetic aperture controlled electromagnetic source for time-lapse monitoring of a reservoir production or injection or hydraulic fracturing.

BACKGROUND

The controlled source electromagnetic (CSEM) technique has been considered as a potential reservoir monitoring tool due to the direct sensitivity of the signal to water saturation. However, the response from time-lapse changes in an oil or gas reservoir undergoing production can be small. In addition, in the case of hydraulic fracturing, the change in the electromagnetic response of a portion of the earth undergoing hydraulic fracturing can be small as well.

SUMMARY

An aspect of the present invention is to provide a system for time lapse monitoring of a target feature within a rock formation. The system includes a data weighted electromagnetic source configured to generate an electromagnetic field in vicinity or at a surface of the rock formation, and an electromagnetic receiver configured to measure a component of the electromagnetic field generated by the source. The data weighted electromagnetic source includes a plurality of electromagnetic sources and an electromagnetic field contribution from each electromagnetic source is weighted so as to enhance the component of the electromagnetic field measured by the electromagnetic receiver.

Another aspect of the present invention is to provide a method for time lapse monitoring of a target feature within a rock formation. The method includes generating an electromagnetic field in vicinity or at a surface of the rock formation using a data weighted electromagnetic source, the data weighted electromagnetic source including a plurality of electromagnetic sources; measuring a component of the electromagnetic field generated by the source using an electromagnetic receiver; and weighting an electromagnetic field contribution from each electromagnetic source so as to enhance the component of the electromagnetic field measured by the electromagnetic receiver.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In one embodiment, a data weighted electromagnetic source such as, but not limited to, a synthetic aperture controlled electromagnetic source, is used to enhance time-lapse signals from reservoirs (e.g., oil reservoirs, gas reservoirs) undergoing production or injection. A synthetic aperture controlled electromagnetic source can also be used to enhance signals from hydraulic fractures in a rock formation of interest. In the following paragraphs, the data weighted electromagnetic source is referred to as a synthetic aperture controlled electromagnetic source. However, the data weighted electromagnetic source is not limited to only a synthetic aperture controlled electromagnetic source but can encompass any other type of data weighted or parameter weighted source. In one embodiment, the synthetic aperture combines signals from a plurality of electromagnetic sources while weighting the contribution from each source so as to enhance the signal received from the reservoir production, injection or hydraulic fracturing. Any type of controlled electromagnetic sources, such as grounded electric dipoles for generating an electric field or current loops for generating a magnetic field can be used to generate electromagnetic radiation to illuminate a subsurface rock formation where the reservoir or the fracture may be present.

The received or measured electromagnetic signal which can include electric fields, magnetic fields, or both, can be detected using electromagnetic receivers in the air, on the ground surface of the rock formation or within the rock formation (e.g., inside boreholes). The measured electromagnetic signal can be processed using a processor and modeled in either the time domain or the frequency domain.

A general formula for constructing a data weighted electromagnetic source (e.g., a synthetic aperture controlled electromagnetic source) signal $S_A$ can be expressed by the following equation (1).

$$S_A(r,\omega) = \sum_{n=1}^{N} A_n e^{-i\phi_n} s(r,r_n,\omega) \tag{1}$$

where $\omega$ is the angular frequency of the signal s generated by each electromagnetic source n (n=1 ... N), r is the position of the synthetic source, $r_n$ is the position of each electromagnetic source 1 ... N, $A_n$ is the weighting amplitude of the electromagnetic signal generated by each electromagnetic source n, $\phi_n$ is the phase of the electromagnetic signal generates by each electromagnetic source n. $A_n$ and $\phi_n$ are referred to as the amplitude steering term and the phase steering term, respectively. The amplitude $A_n$ and $\phi_n$ can be varied to control the contribution of the real part of the data weighted electromagnetic field. Similarly, in-phase or out-of-phase, or both, can be varied to control the contribution of the imaginary part of the data weighted electromagnetic field.

Although, equation (1) can be used to construct the synthetic aperture, as it can be appreciated, the construction of a synthetic aperture is not limited to equation (1) but can include any variation or expression, technique or method that would produce weighted sums of electromagnetic signals that would maximize or enhance a cumulative response from a reservoir production, injection or from hydraulic fracturing within a rock formation.

In one embodiment, this can be accomplished, for example, by treating maximizing or enhancing the time-lapse response as an inverse problem and solving a non-linear optimization for a set of amplitude weights and phase shifts which maximize the time-lapse response. Therefore, the term "synthetic aperture" is used herein to encompass any optimization based generation of combined electromagnetic signals.

Figure 1:
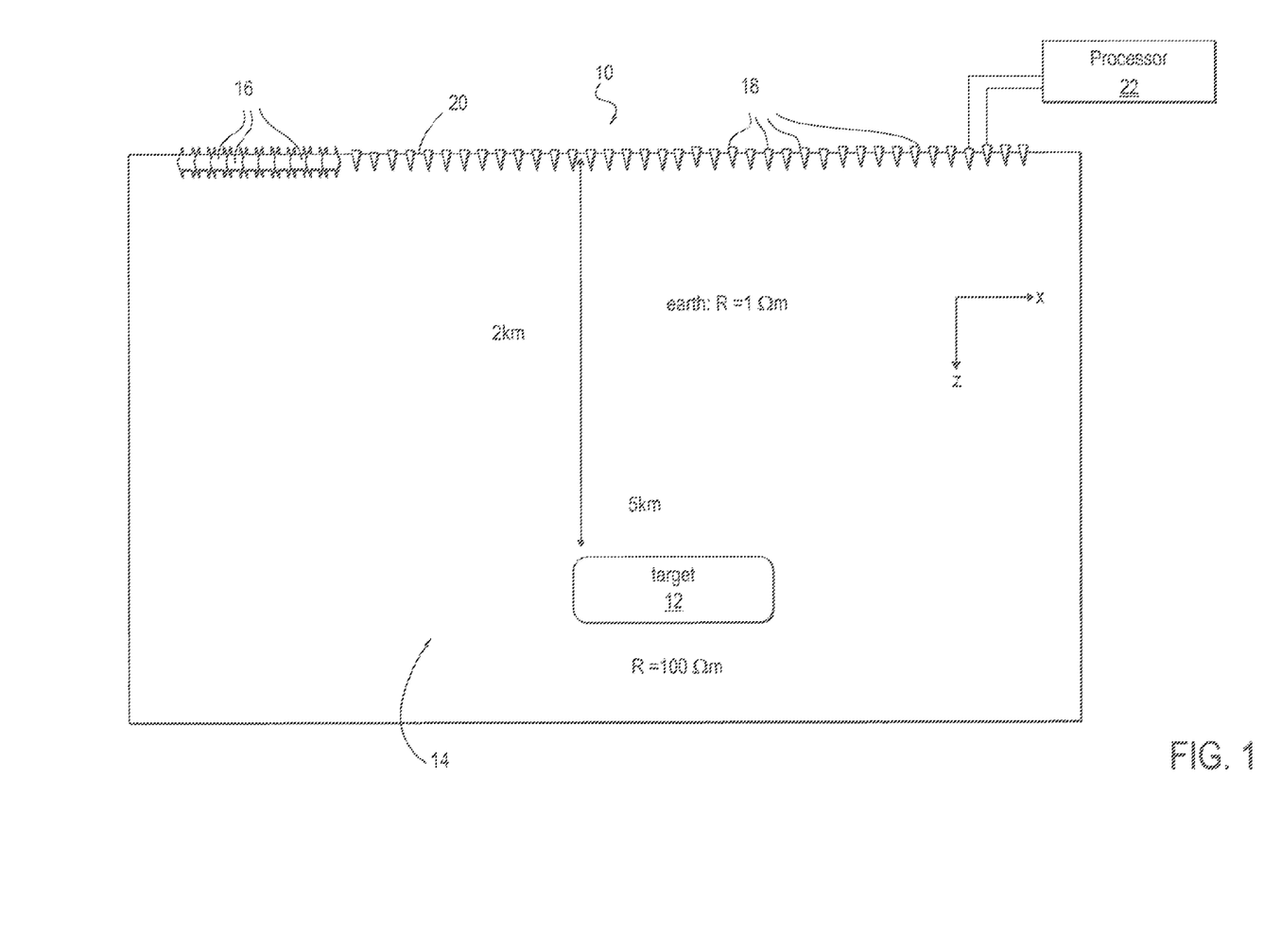
FIG. 1 schematically illustrates a measurement system including sources and receivers, the signals of the sources can be combined to form a data weighted source (e.g., a synthetic aperture source) for characterizing a subsurface zone (target) within a rock formation, according to an embodiment of the present invention.

FIG. 1 schematically illustrates a measurement system 10 including a synthetic aperture for characterizing a subsurface zone (target) 12 within a rock formation 14 according to an embodiment of the present invention. In one embodiment, the target (e.g., reservoir) 12 may exhibit changes due to, for example, injection of resistive carbon dioxide ($CO_2$) into the rock formation 14. In another embodiment, the target (e.g., reservoir) 12 may exhibit changes due to oil or gas extraction (i.e., production) from the target (e.g., reservoir) 12. In yet another embodiment, the target 12 may be a fracture zone within the rock formation 14 that is created using the hydro-fracturing technique by measuring the change to the fracture zone within the rock formation between a pre-hydro-fracturing state and an after-hydro-fracturing state using an electric material and injection fluid (e.g., water) mixture or other resistive material and injection fluid (e.g., water) mixture.

The measurement system 10 includes a plurality of electromagnetic sources (e.g., horizontal electric dipole sources) 16. In one embodiment, the electromagnetic sources 16 are spaced apart. The measurement system 10 further includes a plurality of electromagnetic receivers (e.g., electric-field receivers) 18. In one embodiment, the electromagnetic receivers 18 are spaced apart. In one embodiment, the electromagnetic sources 16 and the electromagnetic receivers 18 are placed on earth surface 20 of rock formation 14. In one embodiment, the target (e.g., reservoir or injection zone or fracture zone) is about 5 km wide by about 100 m thick. In one embodiment, the target is located at a depth of about 2 km below the earth's surface 20. In other embodiments, the target 12 can have any size or shape and can be at any depth. In one embodiment, the synthetic aperture electromagnetic source includes a plurality of electromagnetic sources 16 and an electromagnetic field contribution from each electromagnetic source 16 is weighed so as to enhance the component of the electromagnetic field measured by the electromagnetic receiver 18.

The system 10 further includes a processor 22 configured to calculate a difference between a component of electromagnetic field measured by the receiver or receivers 18 at a first point in time and the component of electromagnetic field measured by the receivers 18 at a second point in time after the first point in time to determine a change in a characteristic of the target feature (e.g., oil or gas reservoir or fracture) within the rock formation.

The change in the characteristic of the target feature includes a fluid volume change in the oil or gas reservoir from a before production or a before injection state to an after production or an after injection state or change of the fracture by hydro-fracturing from a before hydro-fracturing state to an after hydro-fracturing state.

The electromagnetic receiver or receivers 18 is configured to measure the component of the electromagnetic field before production or before injection in a reservoir or before hydro-fracturing a the rock formation to obtain a first electromagnetic response, and to measure the component of the electromagnetic field after production, or after injection in the reservoir or after hydro-fracturing the rock formation to obtain a second electromagnetic response.

The hydro-fracturing the rock formation includes injecting a conductive fluid into the rock formation to increase an electrical conductivity of the rock formation by displacing less conductive fluids that naturally exist in pores, cracks and fractures within the rock formation. The processor 22 is configured to compute a percent change from the first and second electromagnetic responses.

In one embodiment, the measured electromagnetic fields at receiver(s) 18 from sources (16) are combined via equation (1) above to produce a data weighted electromagnetic signal (e.g., synthetic aperture electromagnetic signal) which enhances the changes caused by injection, production or fracturing (e.g., hydraulic fracturing).

In a conventional CSEM measurement, the electromagnetic fields are measured with a plurality of receivers. The measured data is then used in an inversion scheme to produce models of the electrical resistivity of the subsurface or rock formation, with the hope of delineating the target. However, in these conventional measurement systems, for any inversion of data to produce an image, there must be significant signal in the data which is above the measurement noise level. The larger the signal of the target compared to the signal of the background, the better any inversion scheme will be able to resolve the target.

In the measurement system 10, a synthetic aperture is used to constructively combine the electromagnetic fields from the sources 16 to enhance time-lapse signals from reservoirs (e.g., oil reservoirs, gas reservoirs) undergoing production or injection or to enhance signals from hydraulic fractures in a rock formation of interest. A simulated model is constructed where the earth or rock formation 14 is provided with a resistivity of about 1 Ohmmeter, for example, and the target (e.g., reservoir) is provided with a higher resistivity, for example 100 Ohmmeter. Although, the above resistivity values are used in simulating the electromagnetic field response, any other resistivity values can be used.

Figure 2:
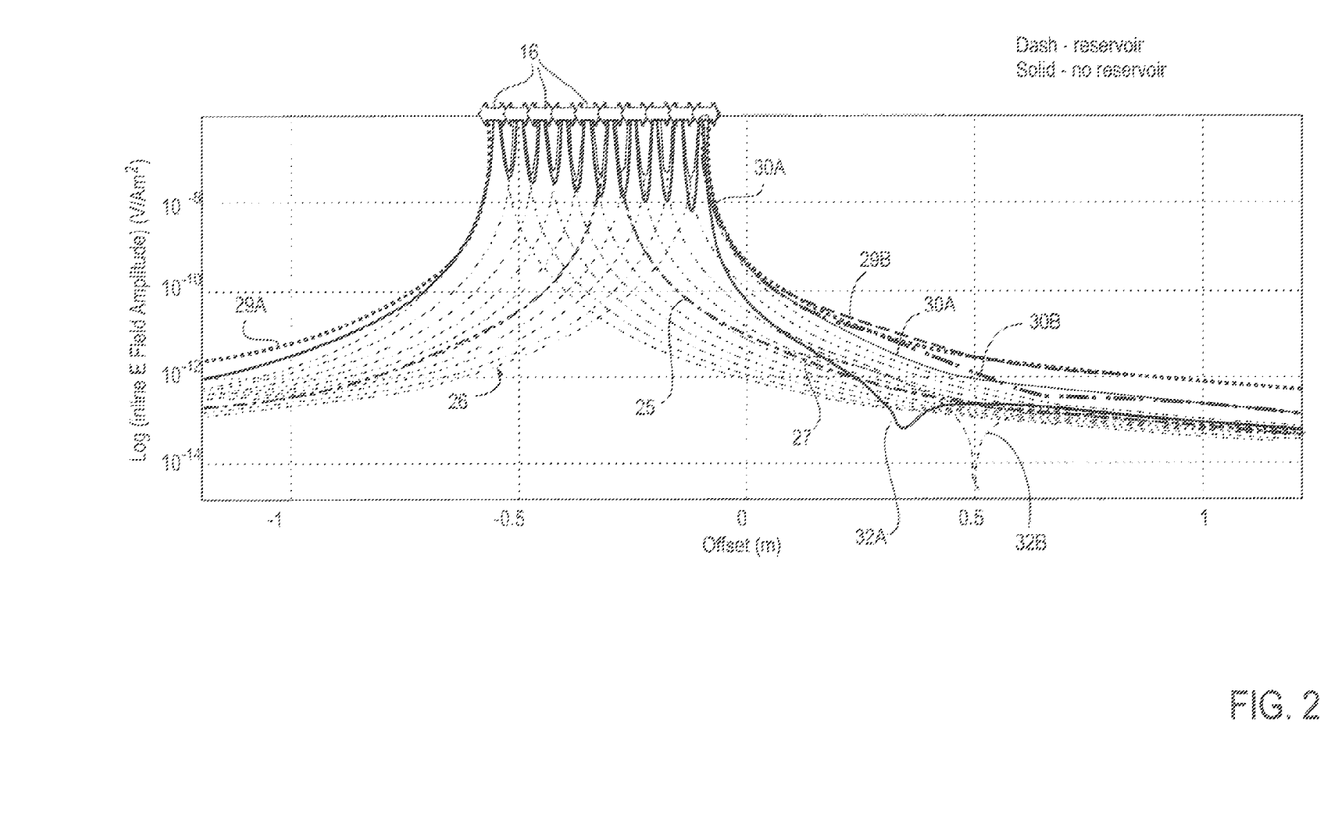
FIG. 2 is a plot of a simulated electromagnetic field amplitude response versus an offset for several combinations of the measured data, according to an embodiment of the present invention.

FIG. 2 is a plot of a simulated electromagnetic field (e.g., E-field) amplitude response versus an offset for several combinations of the measured data, according to an embodiment of the present invention. The plotted electromagnetic field corresponds to the time-lapse, i.e. data after injection minus the data before injection. The electromagnetic field response from a single electric dipole source 16 is shown as curve 25. Each of the electromagnetic sources 16 generates an electromagnetic field (e.g., electric field) similar in shape to the curve 25, as shown in FIG. 2.

Reservoir responses (after production or after injection or after hydro-fracture) are shown as dashed and no-reservoir (before production or before injection or after hydro-fracture) responses are shown as solid curves. The no-reservoir (before injection or before injection or before hydro-fracture) response using one source 16 corresponds to curve 25. The reservoir response (after injection or after fracture or after hydro-fracture) using one source 16 is shown as dashed curve 27. In this embodiment, ten electromagnetic sources are used in the simulation. However, any number of sources 16 can be simulated or used. The responses of nine other sources 16 offset by about 250 m on either side of the curve 25 are also shown as curves 26. Curve 29A corresponds to the sum of all the individual dipole responses 25 and 26, i.e., pre-injection or pre-fracture. Curve 29B corresponds to the sum of all the individual dipole responses 25 and 26, i.e., after-injection or after-fracture. Curve 30A corresponds to no-reservoir (before injection or before production or before hydro-fracture) response when only "phase steering" is applied to the responses of the array of sources 16. Curve 30B corresponds to reservoir (after injection or after production or after hydro-fracture) response when only "phase steering" is applied to the responses of the array of sources 16. Curve 32A corresponds to no-reservoir (before production, before injection or before hydro-fracture) response when both "phase steering" and "amplitude weighting" are applied to the responses of the array of sources 16. Curve 32B corresponds to reservoir (after injection, after production or after hydro-fracture) response when both "phase steering" and "amplitude weighting" are applied to the responses of the array of sources 16.

Figure 3:
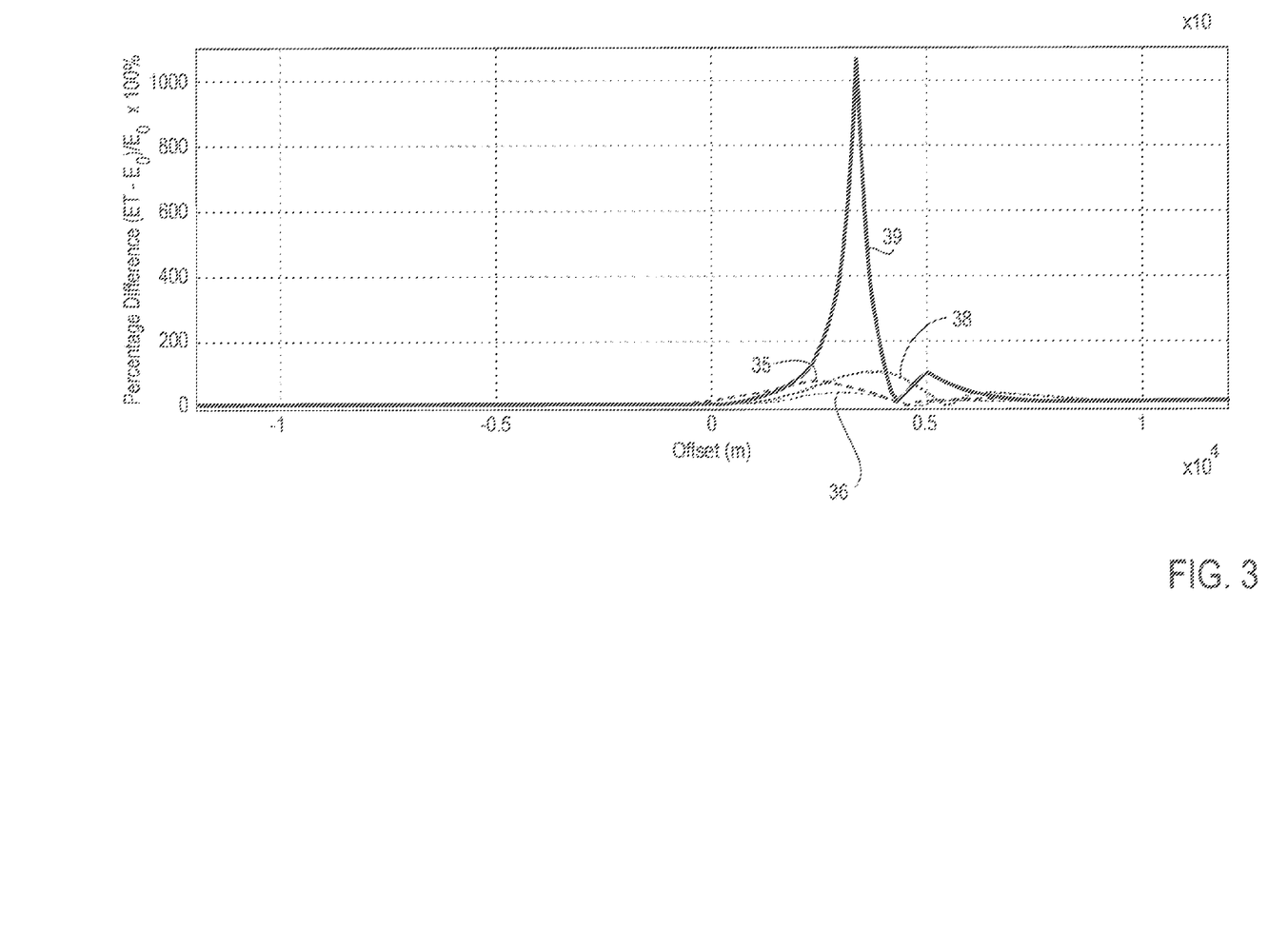
FIG. 3 shows plots of percent change between non-reservoir (before injection or fracture) and reservoir (after injection or fracture) in four types of response, i.e., when only one electromagnetic source is used, when a plurality of electromagnetic sources 16 are used, when only phase steering is applied, and when both phase steering and amplitude weighting are applied, according to an embodiment of the present invention.

FIG. 3 shows plots of the percent change between non-reservoir (before production, before injection or before fracture) and reservoir (after injection, after production or after fracture) in the above four types of response, i.e., when only one electromagnetic source 16 is used, when a plurality (e.g., ten) of electromagnetic sources 16 are used, when only phase steering is applied and when both phase steering and amplitude weighting are applied, according to an embodiment of the present invention. Curve 35 corresponds to the percent change in response between non-reservoir and reservoir when one electromagnetic source 16 is used. The vertical axis corresponds to the percentage difference or percentage change. The horizontal axis corresponds to the offset. The percentage response change C can be expressed by the following equation (2).

$$C = \frac{(E_I - E_0)}{E_0} \times 100\% \quad (2)$$

Where $E_I$ corresponds to the electromagnetic response at reservoir condition (after injection or after fracture), $E_0$ corresponds to the electromagnetic response at non-reservoir condition (before injection, before production or before fracture).

Curve 36 corresponds to the percent change in response between non-reservoir and reservoir, when a plurality (for example, 10) of electromagnetic sources 16 are used. Curve 38 corresponds to the percent change in response between non-reservoir and reservoir when only phase steering is applied. Curve 39 corresponds to the percent change in response between non-reservoir and reservoir when both phase steering and amplitude weighing are applied.

The single electromagnetic source (e.g., electric dipole) produces on the order of a 50% change. The summed electromagnetic field from the plurality of electromagnetic sources (e.g., electric dipoles) produces on the order of 25% change. The phase steering case produces on the order of 70% response change. The phase steering and amplitude weighting produces over a 1000% response change.

Figure 4:
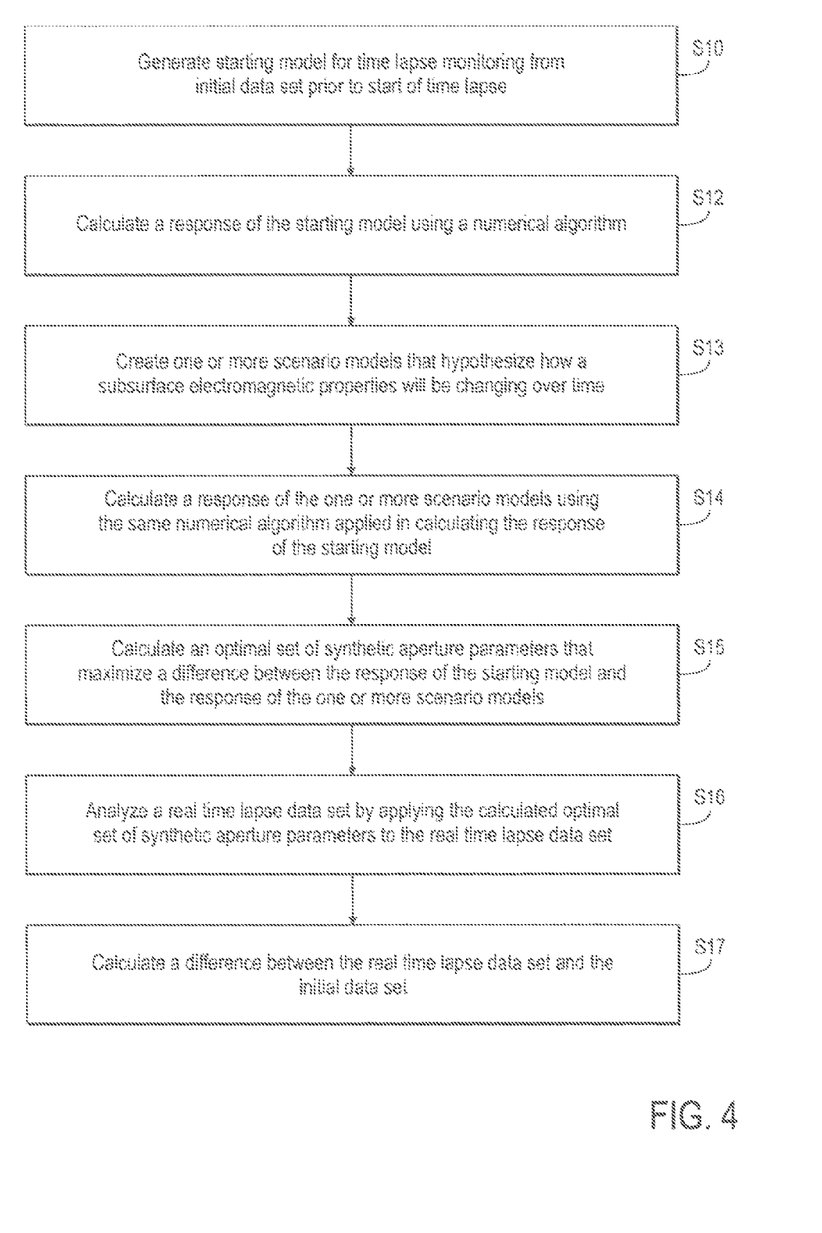
FIG. 4 is a flow diagram for a method of using a synthetic aperture controlled electromagnetic source for time-lapse monitoring of a reservoir production, injection or hydraulic fracturing, according to an embodiment of the present invention.

FIG. 4 depicts a flow diagram for a method of using a synthetic aperture controlled electromagnetic source for time-lapse monitoring of a reservoir production, injection or hydraulic fracturing, according to an embodiment of the present invention. The method includes generating a starting model for time lapse monitoring from initial or starting data set prior to starting time-lapse, at S10. In one embodiment, the starting model can be produced by inversion of an electromagnetic data set (initial data set) that is collected prior to the start of the time-lapse monitoring process using the same general sensor configuration that will be employed during the time lapse monitoring. In another embodiment, the starting model can be produced using other existing geological and geophysical data such as 3D seismic, gravity, and magnetic data, electric resistivity data or any electrical well logs and core samples to construct an electrical conductivity model.

The method further includes calculating a response (e.g., 3D numerical response) of the starting model using a numerical algorithm, at S12. In one embodiment, examples of numerical algorithms that can be used to calculate the response of the starting model include finite difference and finite element codes in one, two or three dimensions. In one embodiment, the acquisition system sources 16 and sensor or receiver array 18 have the same geometry as the field acquisition used to acquire the field time lapse data. In other words, the source and receiver configuration (e.g., position, orientation, amplitude and/or phase of signals) is the same as that of the field acquisition system used to acquire the field time lapse data.

The method also includes creating one or more "scenario" models that hypothesize how the subsurface electromagnetic properties will be changing over time, or will be different at specific times, at S13. In one embodiment, the scenario models can be created using numerical data generated from flow simulations.

The method further includes calculating a response of the one or more scenario models using the same electromagnetic numerical algorithm as applied when calculating the response of the starting model, at S14. In one embodiment, the acquisition system (sources and receivers) geometry or configuration (e.g., position, orientation, amplitude and/or phase of the signals) is identical to the field acquisition geometry or configuration used to acquire the time lapse field data.

The method further includes calculating, at S15, an optimal set of synthetic aperture parameters that maximize the difference between the response of the starting model and the response of the one or more scenario models. In one embodiment, the parameters include amplitude, phase, or both of the one or more measured electric and/or magnetic fields.

The method further includes analyzing real time lapse data set by applying the calculated optimal synthetic parameters to the real time lapse data set, at S16. The method further includes calculating a difference between the time-lapse data set and the starting data set, at S17.

Note that if no initial or starting data are available prior to the collection of the time-lapse data, the collected time lapse data can be differenced against the numerical data or response computed in S12.

Although the example provided herein represents an injection of a resistive fluid into a conductive host, the technique applies equally to enhancing the signal of any subsurface changes in electrical resistivity or magnetic permeability by any process. This process would include, but not be limited to, reservoir production, injection and hydraulic fracturing.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A system for time lapse monitoring of a target feature within a rock formation, the system comprising:
a data weighted electromagnetic source located on the rock formation at an earth's surface configured to generate an electromagnetic field that penetrates from the earth's surface to the target feature at depth within the rock formation; and
an electromagnetic receiver configured to measure a component of the electromagnetic field generated by the source wherein the component of the electromagnetic field contains information related to the target feature within the rock formation,
wherein the data weighted electromagnetic source includes a plurality of electromagnetic sources and an electromagnetic field contribution from each electromagnetic source is weighted so as to enhance the component of the electromagnetic field measured by the electromagnetic receiver and wherein the weighting is done as $S_A(r, \omega) = \sum_{n=1}^{N} A_n e^{-i\phi_n} s(r, r_n, \omega)$ where $\omega$ is the angular frequency of the signal s generated by each electromagnetic source n (n=1 ... N), r is the position of the synthetic source, $r_n$ is the position of each electromagnetic source 1 ... N, $A_n$ is the weighting amplitude of the electromagnetic signal generated by each electromagnetic source n, $\phi_n$ is the phase of the electromagnetic signal generated by each electromagnetic source n.

2. The system according to claim 1, wherein amplitude, phase or both of each electromagnetic field generated by each of the plurality of electromagnetic sources is selected so as to enhance the component of the electromagnetic field measured by the electromagnetic receiver.

3. The system according to claim 1, wherein in-phase and out-of-phase of the imaginary part of each electromagnetic field generated by each of the plurality of electromagnetic sources is selected so as to enhance the component of the electromagnetic field measured by the electromagnetic receiver.

4. The system according to claim 1, further comprising a processor configured to calculate a difference between a component of electromagnetic field measured at a first point in time and a component of electromagnetic field measured at a second point in time after the first point in time to determine a change in a characteristic of the target feature within the rock formation.

5. The system according to claim 4, wherein the target feature includes an oil reservoir, a gas reservoir, or a fracture.

6. The system according to claim 5, wherein a change in the characteristic of the target feature includes a fluid volume change in the oil or gas reservoir from a before production or a before injection state to an after production or an after injection state or change of the fracture by hydro-fracturing from a before hydro-fracturing state to an after hydro-fracturing state.

7. The system according to claim 1, further comprising a processor configured to perform an inversion process on the component of the electromagnetic field measured by the electromagnetic receiver to obtain an enhanced image of the target feature.

8. The system according to claim 7, wherein the processor is configured to perform the inversion process by using a sampling based stochastic algorithm where the measured component of electromagnetic field is used in a likelihood function or a deterministic gradient based inversion algorithm where the measured component of electromagnetic field is used in an object function.

9. The system according to claim 1, wherein the plurality of electromagnetic sources include a plurality of electric dipole sources.

10. The system according to claim 1, wherein the plurality of electromagnetic sources include a plurality of magnetic field sources.

11. The system according to claim 1, wherein the electromagnetic receiver includes one or more electric field receivers.

12. The system according to claim 1, wherein the electromagnetic receiver includes one or more magnetic field receivers.

13. The system according to claim 1, wherein the electromagnetic receiver is configured to measure the component of the electromagnetic field before production or before injection in a reservoir or before hydro-fracturing the rock formation to obtain a first electromagnetic response, and to measure the component of the electromagnetic field after production, or after injection in the reservoir or after hydro-fracturing the rock formation to obtain a second electromagnetic response.

14. The system according to claim 13, wherein hydro-fracturing the rock formation includes injecting an electrically conductive fluid into the rock formation to increase an electrical conductivity of the rock formation by displacing less electrically conductive fluids that naturally exist within the rock formation wherein the increase in the electrical conductivity is designed to be greater than a noise level in the component of the electromagnetic field.

15. The system according to claim 13, wherein hydro-fracturing the rock formation includes injecting a magnetically enhanced fluid into the rock formation to increase its magnetic susceptibility by displacing less magnetically susceptible material or fluids that naturally exist within the rock formation wherein the increase in the magnetic susceptibility is designed to be greater than a noise level in the component of the electromagnetic field.

16. The system according to claim 13, further comprising a processor configured to compute a percent change from the first and second electromagnetic response.

17. A method for time lapse monitoring of a target feature within a rock formation, the method comprising:
generating an electromagnetic field that penetrates from an earth's surface to the target feature at depth within the rock formation using a data weighted electromagnetic source located on the rock formation at the earth's surface, the data weighted electromagnetic source including a plurality of electromagnetic sources;
measuring a component of the electromagnetic field generated by the source using an electromagnetic receiver wherein the component of the electromagnetic field contains information related to the target feature within the rock formation; and
weighting an electromagnetic field contribution from each electromagnetic source so as to enhance the component of the electromagnetic field measured by the electromagnetic receiver wherein the weighting is done as $S_A(r, \omega) = \sum_{n=1}^{N} A_n e^{-i\phi_n} s(r,r_n,\omega)$ where $\omega$ is the angular frequency of the signal s generated by each electromagnetic source n (n=1 ... N), r is the position of the synthetic source, $r_n$ is the position of each electromagnetic source 1 ... N, $A_n$ is the weighting amplitude of the electromagnetic signal generated by each electromagnetic source n, $\phi_n$ is the phase of the electromagnetic signal generated by each electromagnetic source n.

18. The method according to claim 17, further comprising selecting amplitude, phase or both of each electromagnetic field generated by each of the plurality of electromagnetic sources so as to enhance the component of the electromagnetic field measured by the electromagnetic receiver.

19. The method according to claim 17, further comprising selecting in-phase and out-of-phase of the imaginary part of each electromagnetic field generated by each of the plurality of electromagnetic sources so as to enhance the component of the electromagnetic field measured by the electromagnetic receiver.

20. The method according to claim 17, further comprising calculating a difference between a component of electromagnetic field measured at a first point in time and a component of electromagnetic field measured at a second point in time after the first point in time to determine a change in a characteristic of the target feature within the rock formation.

21. The method according to claim 20, wherein the target feature includes an oil reservoir, a gas reservoir, or a fracture.

22. The method according to claim 21, wherein determining the change in the characteristic of the target feature includes determining a fluid volume change in the oil or gas reservoir from a before production or a before injection state to an after production or an after injection state or change of the fracture by hydro-fracturing from a before hydro-fracturing state to an after hydro-fracturing state.

23. The method according to claim 17, further comprising performing an inversion process on the component of the electromagnetic field measured by the electromagnetic receiver to obtain an enhanced image of the target feature.

24. The method according to claim 23, wherein performing the inversion process comprises performing the inversion process by using a sampling based stochastic algorithm where the measured component of electromagnetic field is used in a likelihood function or a deterministic gradient based inversion algorithm where the measured component of electromagnetic field is used in an object function.

25. The method according to claim 17, wherein the plurality of electromagnetic sources include a plurality of electric dipole sources.

26. The method according to claim 17, wherein the plurality of electromagnetic sources include a plurality of magnetic field sources.

27. The method according to claim 17, wherein the electromagnetic receiver includes one or more electric field receivers.

28. The method according to claim 17, wherein the electromagnetic receiver includes one or more magnetic field receivers.

29. The method according to claim 17, wherein measuring by the electromagnetic receiver comprises measuring the component of the electromagnetic field before production or before injection in a reservoir or before hydro-fracturing the rock formation to obtain a first electromagnetic response, and measuring the component of the electromagnetic field after production, or after injection in the reservoir or after hydro-fracturing the rock formation to obtain a second electromagnetic response.

30. The method according to claim 29, wherein hydro-fracturing the rock formation includes injecting an electrically conductive fluid into the rock formation to increase an electrical conductivity of the rock formation by displacing less electrically conductive fluids that naturally exist within the rock formation wherein the increase in the electrical conductivity is designed to be greater than a noise level in the component of the electromagnetic field.

31. The method according to claim 29, wherein hydro-fracturing the rock formation includes injecting a magnetically enhanced fluid into the rock formation to increase its magnetic susceptibility by displacing less magnetically susceptible material or fluids that naturally exist within the rock formation wherein the increase in the magnetic susceptibility is designed to be greater than a noise level in the component of the electromagnetic field.

32. The method according to claim 29, further comprising computing a percent change from the first and second electromagnetic response.

* * * * *